(12) United States Patent
Reich et al.

(10) Patent No.: US 6,519,551 B1
(45) Date of Patent: Feb. 11, 2003

(54) METHOD OF CLASSIFYING WEIGHT INFORMATION IN A VEHICLE WEIGHT CLASSIFICATION SYSTEM

(75) Inventors: Daniel Reich, Macomb, MI (US); Alanna Marie Quail, Oakland Township, MI (US); Emmanuel V. Garcia, Sterling Hts., MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 129 days.

(21) Appl. No.: 09/650,132

(22) Filed: Aug. 29, 2000

Related U.S. Application Data
(60) Provisional application No. 60/152,420, filed on Sep. 3, 1999.

(51) Int. Cl.$^7$ .......................... G06F 15/00; B60R 22/00
(52) U.S. Cl. .......................... 702/173; 702/176; 701/45
(58) Field of Search ................... 702/173, 174, 702/175, 176, 177; 701/45, 49; 280/734, 735; 180/268, 271, 273

(56) References Cited

U.S. PATENT DOCUMENTS

| | | | |
|---|---|---|---|
| 5,413,378 A | | 5/1995 | Steffens |
| 5,573,269 A | | 11/1996 | Gentry |
| 5,626,359 A | * | 5/1997 | Steffens, Jr. et al. ........ 280/735 |
| 5,732,375 A | | 3/1998 | Cashler |
| 5,821,633 A | | 10/1998 | Burke |
| 5,906,393 A | | 5/1999 | Mazur |
| 6,070,115 A | * | 5/2000 | Oestreicher et al. .......... 701/45 |
| 6,243,634 B1 | * | 6/2001 | Oestreicher et al. .......... 701/45 |
| 6,330,501 B1 | * | 12/2001 | Breed et al. .................. 701/49 |

FOREIGN PATENT DOCUMENTS

| | | |
|---|---|---|
| WO | 9710115 A | 3/1997 |
| WO | 9814345 A | 4/1998 |
| WO | 9938731 A | 8/1999 |

OTHER PUBLICATIONS

Written Opinion dated Aug. 17, 2001 regarding International Application No. PCT/US00/23681.

\* cited by examiner

*Primary Examiner*—Bryan Bui

(57) ABSTRACT

A vehicle weight classification system includes a method of classifying weight information. A plurality of zones are defined and are associated with each of the weight classifications. In one example, the upper and lower limits of the zones overlap those of an adjacent zone. The upper and lower limits of the zones preferably also overlap the thresholds of the corresponding weight classifications. Whenever weight information exists within a zone, a value for that zone is increased. The zone having the highest value is determined to be the zone where the weight information should be classified. The weight information is then classified into the classification associated with the zone having the highest value.

26 Claims, 2 Drawing Sheets

METHOD OF CLASSIFYING WEIGHT INFORMATION IN A VEHICLE WEIGHT CLASSIFICATION SYSTEM

CROSS-REFERENCE TO RELATED APPLICATIONS

This application claims priority to United States Provisional Application No. 60/152,420 filed on Sep. 3, 1999.

BACKGROUND OF THE INVENTION

This invention generally relates to vehicle weight classification systems. More particularly, this invention relates to a method of classifying weight information in a vehicle weight classification system.

Modern day vehicles include several types of safety restraint devices. Conventional seat belts are provided to secure drivers and passengers in a safe position on their seat. Additionally, airbags have been included in vehicles as an additional safety restraint device to prevent injury during an accident. While airbags have proven useful, they are not without drawbacks. One issue that has been recognized in the industry is that it would be advantageous to customize the deployment of an airbag based upon a seat occupant's size or weight.

The owner of this application has introduced a weight classification system for determining the size or weight of an individual in a vehicle seat. Information from that weight classification system preferably is used to control the operation of the airbag in the event of an accident.

Those skilled in the art are constantly striving to make improvements to vehicle safety systems. This invention presents a more robust decision strategy for classifying weight information that is then used to control airbag deployment. A system designed according to this invention makes more intelligent decisions regarding weight classification compared to prior techniques.

SUMMARY OF THE INVENTION

In general terms, this invention is a method for classifying weight information in a vehicle weight classification system. The preferred method of this invention includes several steps. First, a plurality of classification zones are defined that correspond to vehicle manufacturer weight classifications. A determination is made when the weight information is within one of the zones. Whenever the weight information is within a zone, a value for that zone is increased. The weight information is classified into the classification associated with the zone that has the highest value.

In one example, the value of each zone is determined by monitoring a representation of the weight information within the zone over time. A summation of that representation is used to determine a value for the zone. Additionally, whenever the weight information is not in a zone, the value of that zone preferably is decreased by a predetermined factor.

The various features and advantages of this invention will become apparent to those skilled in the art from the following detailed description of the currently preferred embodiments. The drawings that accompany the detailed description can be briefly described as follows.

DETAILED DESCRIPTION OF A PREFERRED EMBODIMENT

Figure 1:
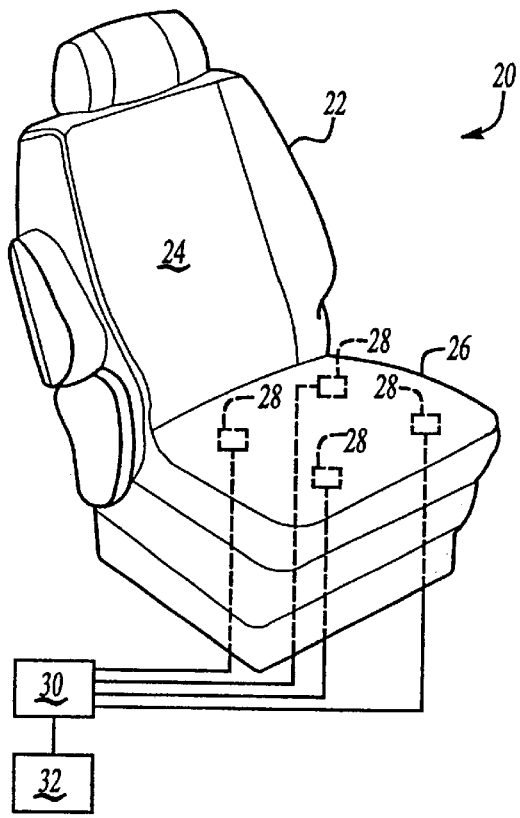
FIG. 1 schematically illustrates a weight classification system designed according to this invention.

A vehicle weight classification system 20 is used to determine the weight of a person or load on a vehicle seat 22. The seat back 24 and seat base 26 are conventional except for the inclusion of a plurality of sensors 28 in the seat base 26. The sensors 28 gather information regarding the weight of an occupant of the seat 22 and provides signals to a control module 30, which preferably determines an approximate weight of the individual in the seat 22. More details regarding a weight determination or weight classification system with which this invention preferably is used can be found in U.S. patent application Ser. No. 09/191,719, filed on Nov. 12, 1998, which is commonly owned with this application. The teachings of that specification are incorporated into this specification by reference.

A weight classification module 32 preferably communicates with the weight determining module 30 and processes the weight information in a manner according to this invention. Although individual modules 30 and 32 are illustrated for discussion purposes, those skilled in the art will appreciate that a single controller may perform both weight determination functions and weight classification functions as may be needed in a given situation. The weight classification module 32 preferably comprises a suitably programmed microprocessor that gathers determined weight information and places it within a classification defined by a vehicle manufacturer or supplier.

Figure 2:
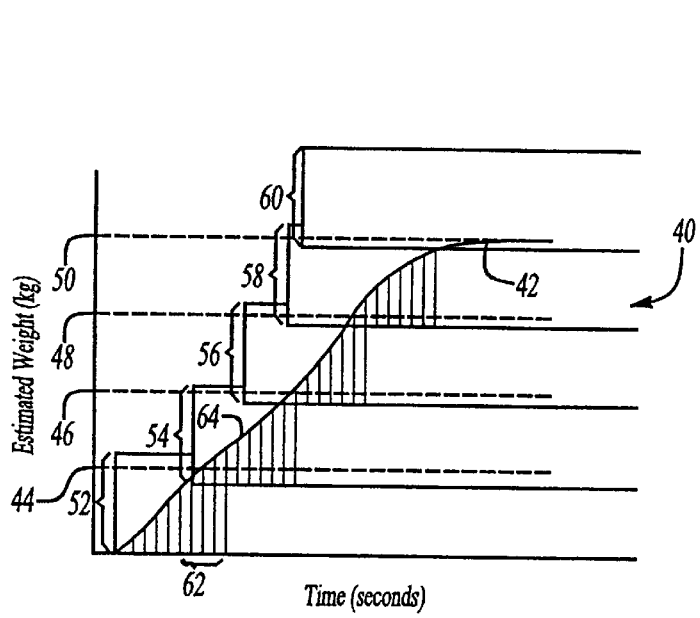
FIG. 2 graphically illustrates an implementation of the method of this invention.

FIG. 2 graphically illustrates an implementation of the methodology of this invention. A graph 40 of the estimated weight information over time is shown by the curve 42. A set of weight classifications, which preferably are determined by a vehicle manufacturer or airbag supplier, are illustrated by the thresholds 44, 46, 48 and 50. If the determined weight is below the threshold 44, for example, it fits within a first weight classification. The weight classifications correspond to a mode of airbag control or deployment. This invention provides a more robust and more intelligent strategy for deciding which classification the weight information fits into rather than simply placing the weight information into a current classification depending on an instantaneous output of the sensors 28.

A plurality of classification zones are defined and associated with the predetermined weight classifications. For example, zone 52 is associated with the weight classification 44 while zone 56 is associated with a third weight classification having a lower threshold at 46 and an upper threshold at 48. The other zones 54, 58 and 60 each correspond to a weight classification.

In the preferred embodiment of this invention, the upper limit of each classification zone preferably extends beyond the upper threshold of the corresponding weight classification. Additionally, the lower limit of each zone preferably extends below the lowest threshold of that weight classification. Additionally, the upper limit of one zone preferably overlaps the lower limit of an adjacent zone. Overlapping zone limitations provides additional decision making capability within the weight classification system of this invention.

The proper weight classification preferably is determined by determining a value within each zone that corresponds to the amount of time that the weight information is within the zone. In the illustrated example, integrating the area underneath the curve 42 within each zone provides a value for each zone, respectively. The integrated information provides the value of that zone.

It is most preferred to utilize some information within two zones at the same time. For example, at 62 the curve 42 passes through the first zone 52 and the second zone 54. Therefore, the value of each of those two zones preferably is increased based upon the weight information at 62.

The weight classification preferably is determined as the classification associated with the zone that has the highest value. In the illustrated example, the zone within which the greatest integration result is achieved is considered the zone and the associated classification for the weight information. By monitoring the weight information over time and gathering increasing value information, the system 20 is capable of making a more robust and more accurate determination of the weight classification. Instead of merely sampling the weight information at any given time and assigning the weight classification as that classification in which a particular sampled weight information exists, the use of zones and integrating the weight information within each zone provides a more accurate weight classification determination. For example, even though the weight information is at 64 at one point in time, the system 20 determines that the weight information should be classified within the first classification beneath the threshold 44 even though the weight information at that instant is within the second classification between the threshold 44 and 46.

Figure 3:
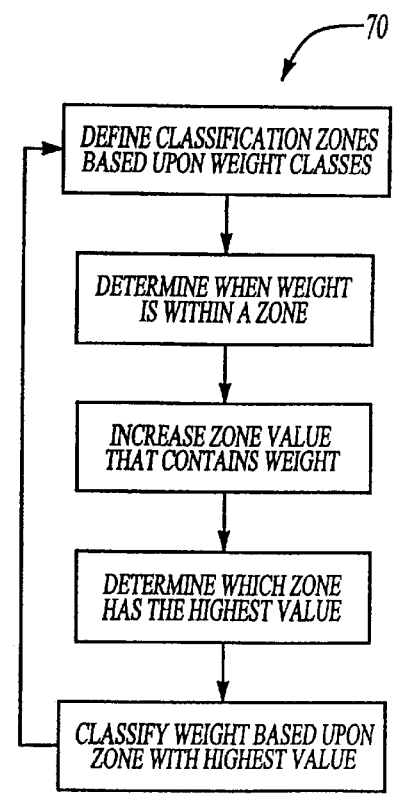
FIG. 3 is a flowchart diagram illustrating a preferred method of this invention.

FIG. 3 includes a flowchart diagram 70 that summarizes the preferred method of this invention. The classification zones 52, 54, 56, 58 and 60 preferably are defined based upon the weight classifications that have been previously determined. As discussed above, the upper and lower limits of each zone preferably overlap the limits of the corresponding classifications and preferably overlap adjacent zone limits. The determination module 32 determines when the weight is within a particular zone. A value for that zone is increased whenever the weight information is in that zone. The zone having the highest value is determined and the weight information is classified based upon the zone with the highest value.

Figure 4:
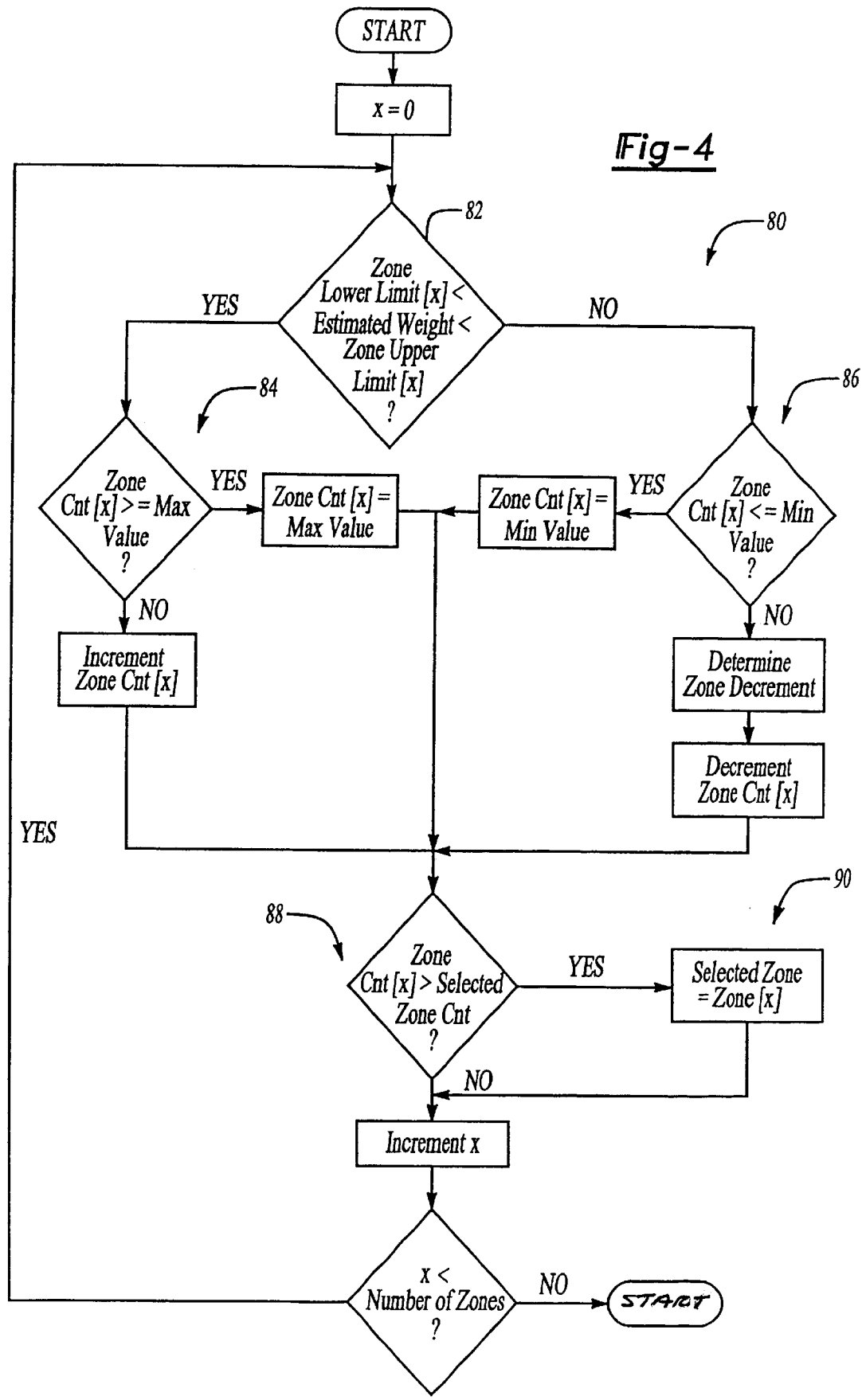
FIG. 4 is a more detailed flowchart diagram illustrating a preferred method of this invention.

FIG. 4 includes a flowchart 80 that illustrates, in more detail, the preferred method of this invention. At 82, the controller module 32 determines whether the estimated weight is within a given zone. If the weight is within a zone, then the steps at 84 are processed to increase the value of that zone up to a maximum value. A maximum value preferably is set for each zone so that if the weight information stays within a zone over a prolonged period of time, that zone value does not increase beyond a chosen maximum. For each zone that does not contain the weight information, the steps at 86 preferably are completed. When a zone does not include the weight information, the value for that zone preferably is decreased by a predetermined forgetting factor. This accommodates situations where the weight moves from one zone into another zone and allows the second zone to become the classification within a shorter period of time than if the value for the first zone were not decreased. The value for each zone preferably is only decreased to a chosen minimum value to avoid having extremely low zone values that may later inhibit an accurate weight determination. At 88, a determination is made whether the current zone or classification of the weight information is less than the value of the zone in which the weight information currently exists. Whenever a new zone has a higher value than a currently selected zone, the switch is made at 90 to the new zone and the weight classification is changed accordingly.

Given this description, those skilled in the art will be able to choose from among commercially available microprocessors to realize the functions of the controller weight classification module 32. Similarly, those who have the benefit of this description will be able to design custom circuitry or software to accomplish the method of this invention.

This invention provides the advantage of customizing transition rates between weight classifications and enhances the intelligence of a decision making process in that regard.

The preceding description is exemplary rather than limiting in nature. Variations and modifications to the disclosed embodiments may become apparent to those skilled in the art that do not necessarily depart from the purview and spirit of this invention. The scope of legal protection for this invention can only be determined by studying the following claims.

We claim:

1. A method of determining a classification of determined weight information, comprising the steps of:
   (A) defining a plurality of classification zones having upper and lower limits associated with upper and lower limits of corresponding weight classifications;
   (B) determining when the weight information is within one of the zones;
   (C) increasing a value for the zone in which the weight information is when the weight information is in said zone;
   (D) determining which of the zones has the highest value; and
   (E) classifying the weight information into the classification zone having the highest value.

2. The method of claim 1, wherein step (B) includes monitoring the weight information over time and determining a representation of the weight information over time.

3. The method of claim 2, including integrating a value of the representation of the weight information within each of the zones and using the integrated value when performing step (D).

4. The method of claim 1, wherein step (C) includes determining a summation of a representation of the weight information over time within the zone in which the weight information is and using the summation as the value of the zone.

5. The method of claim 1, including performing step (C) for the zone in which the weight information is only until a maximum value for the zone is reached.

6. The method of claim 1, wherein step (A) includes having portions of adjacent zones overlap such that the weight information can be within two zones simultaneously.

7. The method of claim 6, including simultaneously performing steps (B) and (C) for each of two adjacent zones when the weight information is within each of the adjacent zones.

8. The method of claim 1, including decreasing a value for each of the other zones when the weight information is not in the other zones.

9. The method of claim 8, wherein the step of decreasing a value is performed for the other zones, respectively, only until a minimum value for the other zones is reached, respectively.

10. A method of classifying determined weight information, comprising the steps of:
   (A) defining a plurality of classification zones that each has an upper limit and a lower limit associated with an upper limit and a lower limit of a corresponding classification;

(B) setting the upper limit of one of the zones to be above a lower limit of an adjacent zone;

(C) determining a value for each zone that is indicative of an amount that the weight information is within each zone; and (D) classifying the weight information within the zone with the greatest value.

11. The method of claim 10, wherein there is a first zone and a last zone and including setting the upper limit of all of the zones excluding the last zone to be above a lower limit of an adjacent zone and setting the lower limit of all of the zones excluding the first zone to be below the upper limit of an adjacent zone.

12. The method of claim 10, wherein step (C) includes increasing a value for the zone in which the weight information is when the weight information is in said zone.

13. The method of claim 12, including simultaneously performing step (C) for each of two adjacent zones when the weight information is within each of the adjacent zones.

14. The method of claim 12, including decreasing a value for each of the other zones when the weight information is not in the other zones.

15. The method of claim 10, wherein step (C) includes determining a summation of a representation of the weight information over time within the zone in which the weight information is and using the summation as the value of the zone.

16. A system for classifying weight information within one of a plurality of classes in a vehicle weight classification assembly, comprising:

a controller that determines when the weight information is within at least one of a plurality of zones associated with the classes, each zone having an upper limit and a lower limit associated with the upper and lower limits of the associated class, the controller increases a value for a zone when the weight information is within said zone, determines which of the zones has the highest value and classifies the weight information into the class associated with the zone having the highest value.

17. The system of claim 16, wherein the controller increases a value of a zone containing the weight information and decreases a value of any zone that does not contain the weight information.

18. The system of claim 16, wherein the controller determines a summation of a representation of the weight information within each zone and uses the summation as the value of the zone to make the classification determination.

19. A method of determining a classification of determined weight information, comprising the steps of:

(A) defining a plurality of classification zones;

(B) determining when the weight information is within one of the zones, monitoring the weight information over time and determining a representation of the weight information over time;

(C) increasing a value for the zone in which the weight information is when the weight information is in said zone;

(D) determining which of the zones has the highest value; and (E) classifying the weight information into the classification zone having the highest value.

20. The method of claim 19, including integrating a value of the representation of the weight information within each of the zones and using the integrated value when determining which of the zones has the highest value.

21. A method of determining a classification of determined weight information, comprising the steps of:

(A) defining a plurality of classification zones;

(B) determining when the weight information is within one of the zones;

(C) increasing a value for the zone in which the weight information is when the weight information is in said zone, including determining a summation of a representation of the weight information over time within said zone and using the summation as the value of the zone;

(D) determining which of the zones has the highest value; and (E) classifying the weight information into the classification zone having the highest value.

22. A method of determining a classification of determined weight information, comprising the steps of:

(A) defining a plurality of classification zones having portions of adjacent zones overlap such that the weight information can be within two zones simultaneously;

(B) determining when the weight information is within one of the zones;

(C) increasing a value for the zone in which the weight information is when the weight information is in said zone;

(D) determining which of the zones has the highest value; and (E) classifying the weight information into the classification zone having the highest value.

23. The method of claim 22, including simultaneously performing steps (B) and (C) for each of two adjacent zones when the weight information is within each of the adjacent zones.

24. A method of classifying determined weight information, comprising the steps of:

(A) defining a plurality of classification zones that each has an upper limit and a lower limit;

(B) setting the upper limit of one of the zones to be above a lower limit of an adjacent zone;

(C) determining a value for each zone that is indicative of an amount that the weight information is within each zone including increasing a value for the zone in which the weight information is when the weight information is in said zone and simultaneously increasing the value for each of two adjacent zones when the weight information is in each of the adjacent zones; and (D) classifying the weight information within the zone with the greatest value.

25. A method of classifying determined weight information, comprising the steps of:

(A) defining a plurality of classification zones that each has an upper limit and a lower limit;

(B) setting the upper limit of one of the zones to be above a lower limit of an adjacent zone;

(C) determining a value for each zone that is indicative of an amount that the weight information is within each zone, including determining a summation of a representation of the weight information over time within the zone and using the summation as the value of the zone; and (D) classifying the weight information within the zone with the greatest value.

26. A system for classifying weight information within one of a plurality of classes in a vehicle classification assembly, comprising:

a controller that determines when the weight information is within at least one of a plurality of zones associated with the classes, increases a value for a zone when the weight information is within said zone, determines a summation of a representation of the weight information within each zone and uses the summation as a value of the zone, determines which of the zones has the highest value and classifies the weight information into the class associated with the zone having the highest value.

* * * * *